Patented July 22, 1941

2,250,396

UNITED STATES PATENT OFFICE 2,250,396

VITAMIN B6 INTERMEDIATES

Walter Salzer, Wuppertal-Elberfeld, Germany, assignor to Winthrop Chemical Company, Inc., New York, N. Y., a corporation of New York No Drawing. Application February 3, 1940, Serial No. 317,117. In Germany February 25, 1939

7 Claims. (Cl. 260—297)

This invention relates to certain new quinaldine and pyridine compounds and to a process of preparing the same.

It is the object of my present invention to produce quinaldine and pyridine compounds which are intermediates in the synthetic manufacture of Vitamin B6. The said quinaldine compounds have the formula

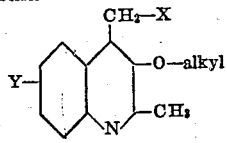

wherein X stands for a substituent selected from the group consisting of amino, hydroxyl, halogen and alkoxy groups and Y stands for a substituent of the group consisting of hydrogen, nitro and amino groups. They are further converted into the pyridine compounds of the formula

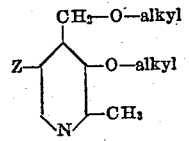

wherein Z stands for a substituent of the group consisting of carboxylic, carboxylic acid halide, carboxylic acid amide and nitril groups.

According to my present invention the said new quinaldine and pyridine compounds are obtainable by reacting upon a 3-alkoxy-quinaldine-4-carboxylic acid derivative, such as the 4-carboxylic acid halides and the 4-carboxylic acid esters, with ammonia to form a 3-alkoxy-quinaldine-4-carboxylic acid amide, converting the latter product into the corresponding 4-nitrile compound by the action of a dehydrating agent, such as phosphorus oxychloride or acid anhydrides, for instance phosphorus pentoxide and acetic anhydride, transforming the 3-alkoxy-quinaldine-4-nitrile into a 3-alkoxy-4-aminomethyl-quinaldine by the action of a hydrogenating agent, for instance by treatment with hydrogen in the presence of a hydrogenating catalyst, acting upon the 3-alkoxy-4-amino-methyl-quinaldine formed with nitrous acid, etherifying the hydroxyl group of the 3-alkoxy-4-hydroxymethyl-quinaldine formed in the customary manner, for instance by first converting the hydroxymethyl group into a halogenmethyl group and then replacing the halogen by the action of a metal alcoholate, then nitrating the 3-alkoxy-4-alkoxymethyl-quinaldine by means of the usual nitrating agents and reducing the nitro compound obtained to the corresponding amino compound by the action of a usual reducing agent. The bz-amino-3-alkoxy-4-alkoxymethyl-quinaldines thus obtainable are then further converted into the pyridine compounds of the kind specified above by reacting upon the said amino compounds with an oxidizing agent to form a 2-methyl-3-alkoxy-4-alkoxymethyl-pyridine-5,6-dicarboxylic acid, splitting off the carboxylic group in 6-position by heat treatment, transforming the 5-carboxylic group into a 5-carboxylic acid halide group in a manner known per se, for instance by means of thionylhalide, acting upon the 2-methyl-3-alkoxy-4-alkoxymethyl-pyridine-5-carboxylic acid halide with ammonia and converting the 2-methyl-3-alkoxy-4-alkoxymethyl-pyridine-5-carboxylic acid amide into a 2-methyl-3-alkoxy-4-alkoxymethyl-pyridine-5-nitrile by the action of a dyhydrating agent, such as phosphorus oxychloride or acid anhydrides, for instance phosphorus pentoxide and acetic anhydride. The said reactions take place rather readily and with satisfactory yields. This is most surprising in view of the various reactive substituents which are present in the molecule. For instance the hydroxymethyl group of the 3-alkoxy-4-hydroxymethyl quinaldine may be readily etherified without saponification of the 3-alkoxy group by converting the hydroxymethyl group into the bromomethyl group by treatment with concentrated hydrobromic acid at a moderate temperature. The bromomethyl compound may then be transformed into an alkoxymethyl compound by treatment with a metal alcoholate. Also when nitrating the 3-alkoxy-4-alkoxymethyl-quinaldines for instance with concentrated nitric acid, the alkoxy and alkoxymethyl substituents remain unchanged. It further appears most remarkable that only the benzene ring is oxidized when reacting upon the bz-amino-3-alkoxy-4-alkoxymethyl-quinaldine in spite of the fact that the pyridine nucleus has been loosened up by complete substitution of the ring and groups containing oxygen are present as substituents. For the oxidation preferably an alkaline solution of permanganate is used.

The invention is illustrated by the following example without, however, being restricted thereto:

Example 100 parts of 3-methoxy-quinaldine-4-carboxylic acid are gradually introduced at room temperature into 200 parts of thionyl-chloride. The acid thereby dissolves readily with the evolution of gas. After ½ hour's standing the excess thionylchloride is distilled off under reduced pressure. The solid residue is rubbed on with a small quantity of ether and filtered with suction. The acidchloride-hydrochloride thus obtained is gradually introduced into 2 liters of 25% aqueous ammonia while stirring. Thereby the acid amide precipitates at once and is filtered off with suction.

100 parts of the 3-methoxy-quinaldine-4-carboxylic acid amide thus obtained are covered by pouring with 500 parts of phosphorus oxychloride and boiled for 2-3 hours while cooling under reflux. Thereby gradually a clear brown solution is obtained. The excess phosphorus oxychloride is evaporated under reduced pressure and the oily residue is poured on to ice. It is now made alkaline to litmus by the addition of ammonia and the nitrile precipitating hereby dissolved in methylenechloride. The methylenechloride solution is dried with potassium carbonate and the methylenechloride is evaporated from the dry solution. The remaining solid residue is distilled under reduced pressure. The 3-methoxy-quinaldine-4-carboxylic acid nitrile thus obtained distils under 5 mms. pressure at 150° C. as an oil which solidifies to crystals melting at 88° C.

100 parts of this product are shaken with 10 parts of animal charcoal, 10 parts of palladious chloride solution, 500 parts of concentrated hydrochloric acid and 1500 parts of water with hydrogen at room temperature until after the taking up of 2 mols of hydrogen no further hydrogen is taken up any more. The solution is now freed from the animal charcoal by filtration with suction, it is made strongly alkaline with sodium hydroxide solution and the oil precipitated is extracted with methylenechloride. The residue remaining after drying of the methylenechloride solution and the evaporation of the solvent is distilled under reduced pressure. The 3-methoxy - 4 - aminomethyl - quinaldine thus obtained distils as a colorless liquid under 4 mm. pressure at 156° C.

100 parts of 3 - methoxy - 4 - aminomethyl - quinaldine are dissolved in 500 parts of 4-normal hydrochloric acid and gradually treated while stirring with a solution of 35 parts of sodium nitrite in 150 parts of water at 60° C. The reaction takes place at once with the evolution of nitrogen. After cooling the mixture is made alkaline with ammonia; thereby the 3-methoxy-4-hydroxymethyl-quinaldine precipitates at once in white crystals melting at 138° C. which are isolated by sucking off.

10 parts of 3 - methoxy - 4 - hydroxymethyl - quinaldine are dissolved in 100 parts of hydrobromic acid (specific gravity=1.7) and heated for half an hour to 50° C. The hydrobromic acid is evaporated under reduced pressure, the solid residue is covered by pouring with a solution of 10 parts of sodium in 150 parts of methanol and the mixture is then heated for half an hour on the water-bath. After the addition of 150 parts of water the methanol is evaporated under reduced pressure and the remaining solution is shaken out with methylenechloride. The methylenechloride solution is dried by way of potassium carbonate, the methylenechloride is evaporated and the 3 - methoxy - 4 - methoxymethyl - quinaldine thus obtained is purified by distillation under reduced pressure. It distils under 3 mms. pressure at 145° C. as a colorless oil which on storing gradually solidifies to crystals melting at 48° C.

1 part of 3 - methoxy - 4 - methoxymethyl - quinaldine is introduced while cooling with ice into 10 parts of nitric acid (specific gravity=1.5). The solution obtained is at once poured on to ice and the mixture is made alkaline with ammonia. Thereupon the nitration product precipitates at first as a yellow oil which after some storing solidifies to yellow-green crystals. It melts at about 85° C.

2.6 parts of the above-mentioned nitration product are gradually introduced into 10 parts of a 66% solution of stannous chloride of 60° C. in concentrated hydrochloric acid. A tin-double salt precipitates at once which is sucked off. From this salt the bz-amino compound of the 3-methoxy-4-methoxymethyl - quinaldine is set free by means of concentrated sodium hydroxide solution and shaken out with methylenechloride. When worked up in the usual way this amino compound is obtained as slightly yellowish viscous oil which boils at 160° C. under 0.4 mm. pressure; on storing the oil slowly solidifies to crystals.

1 part of the amino compound mentioned above is suspended in 250 parts of water, containing ½ part of barium hydroxide, and gradually treated, while permanently cooling with ice, with a solution of 3 parts of barium permanganate in 150 parts of water. Thereupon the mixture is heated for a short time, sucked off while hot from manganese dioxide, the manganese dioxide is several times extracted with boiling water and the united filtrates are concentrated to ⅛ of their volume under reduced pressure. The concentrated solution is shaken out with methylenechloride; the barium ions are now precipitated from the aqueous solution by the addition of the required quantity of sulfuric acid as barium sulfate. The filtrate from the barium sulfate precipitate is evaporated to dryness under reduced pressure. The 2-methyl-3-methoxy-4-methoxymethyl-pyridine-5.6-dicarboxylic acid is obtained after rubbing on with acetone and filtration with suction as a yellow powder which readily dissolves in water. The aqueous solution of this dicarboxylic acid yields a strong red coloration with ferrous sulfate. On heating carbon dioxide is split off and 2-methyl-3-methoxy-4-methoxymethyl-pyridine-(5)-carboxylic acid (melting at 134° C.) is obtained. Its methylester boils under 2 mms. pressure at 135° C., the methylesterpicrate melts at 129° C. (from alcohol).

1 part of 2-methyl - 3 - methoxy - 4 - methoxymethyl-pyridine-(5)-carboxylic acid is treated with 5 parts of thionylchloride. The substance dissolves with the evolution of gas and while heating. After ¼ hour's standing at room temperature the excess thionylchloride is evaporated under reduced pressure. The residue is covered by pouring with 10 parts of concentrated aqueous ammoniacal solution. One part of the carboxylic acid amide formed precipitates thereby. The whole mixture is evaporated under reduced pressure and the solid white residue is extracted several times with warm methylenechloride. After the evaporation of the methylenechloride the 2-methyl-3-methoxy-4-methoxymethyl-pyridine-(5)-carboxylic acid amide is obtained in crystals melting at 130° C.

1 part of this amide is boiled under reflux with 5 parts of phosphorus oxychloride. After a short time the substance has dissolved. It is still boiled for a short time and thereupon the phosphorus oxychloride is evaporated under reduced pressure. The residue is treated with ice-water and the mixture is extracted with ether after the addition of ammonia until it reacts alkaline. The ethereal solution is dried by potassium carbonate, the ether is evaporated and the residue is distilled. The 2-methyl-3-methoxy-4-methoxymethyl-5-cyanopyridine distills under 0.01 mm. pressure as a colorless oil at a heating-bath temperature of 80–90° C.

I claim:

1. The process which comprises reacting upon a 3-alkoxy-quinaldine-4-carboxylic acid derivative of the group consisting of carboxylic acid halide and ester derivatives with ammonia to form the 3-alkoxy-quinaldine-4-carboxylic acid amide, converting the latter into the corresponding 4-nitrile by the action of a dehydrating agent, transforming the 4-nitrile into a 3-alkoxy-4-aminomethyl-quinaldine by the action of a hydrogenating agent, acting upon the 4-aminomethyl compound with nitrous acid, etherifying the hydroxyl group of the 3-alkoxy-4-hydroxymethyl-quinaldine formed in the customary manner, nitrating the 3-alkoxy-4-alkoxymethyl-quinaldine by treatment with nitric acid, reducing the nitro compound obtained to the corresponding amino compound by the action of a reducing agent, converting the amino compound by the action of an oxidizing agent into a 2-methyl-3-alkoxy-4-alkoxymethyl-pyridine-5,6-dicarboxylic acid, splitting off the carboxylic group in 6-position by heat treatment, transforming the 5-carboxylic group into the 5-carboxylic acid halide group in the manner known per se, acting upon the 2-methyl-3-alkoxy-4-alkoxymethyl-pyridine-5-carboxylic acid halide with ammonia and converting the 2-methyl-3-alkoxy-4-alkoxymethyl-pyridine-5-carboxylic acid amide into a 2-methyl-3-alkoxy-4-alkoxymethyl-pyridine-5-nitrile by the action of a dehydrating agent.

2. The process which comprises reacting upon 3-methoxy-quinaldine-4-carboxylic acid chloride with ammonia to form the 3-methoxy-quinaldine-4-carboxylic acid amide, converting the latter into the corresponding 4-nitrile by the action of phosphorus oxychloride, transforming the 4-nitrile into the 3-methoxy-4-aminomethyl-quinaldine by the action of a hydrogenating agent, acting upon the 4-amino-methyl compound with nitrous acid, etherifying the hydroxyl group of the 3-methoxy-4-hydroxymethyl-quinaldine formed by first replacing it by bromine by acting thereupon with strong hydrobromic acid and then replacing the bromine by the methoxy group by the action of an alkali metal methylate, nitrating the 3-methoxy-4-methoxymethyl-quinaldine by treatment with nitric acid, reducing the nitro compound obtained to the corresponding amino compound, converting the amino compound by the action of permanganate into 2 - methyl - 3 - methoxy-4-methoxymethyl-pyridine-5,6-dicarboxylic acid, splitting off the carboxylic group in 6-position by heat treatment, transforming the 5-carboxylic group into the 5-carboxylic acid chloride group by treatment with thionylchloride, acting upon the 2-methyl-3 - methoxy - 4 - methoxymethyl-pyridine-5-carboxylic acid chloride with ammonia and converting the 2 - methyl - 3 - methoxy-4-methoxymethyl-pyridine-5-carboxylic acid amide into the 2-methyl-3-methoxy-4-methoxymethyl-pyridine-5-nitril by the action of phosphorus oxychloride.

3. A compound of the formula

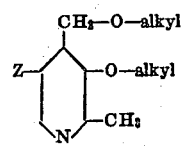

wherein Z stands for a substituent of the group consisting of carboxylic, carboxylic acid halide, carboxylic acid amide and nitrile groups.

4. A compound of the formula

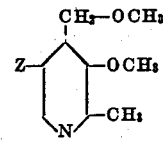

wherein Z stands for a substituent of the group consisting of carboxylic, carboxylic acid halide, carboxylic acid amide and nitrile groups.

5. The compound of the formula

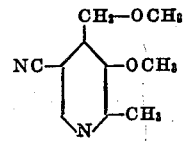

6. The compound of the formula

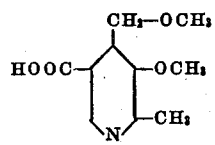

7. The compound of the formula

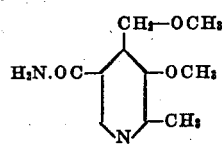

WALTER SALZER.